United States Patent
Yanagi et al.

(10) Patent No.: US 9,761,906 B2
(45) Date of Patent: Sep. 12, 2017

(54) METHOD FOR MANUFACTURING SULFIDE SOLID ELECTROLYTE

(71) Applicant: TOYOTA JIDOSHA KABUSHIKI KAISHA, Toyota-shi, Aichi (JP)

(72) Inventors: Takuo Yanagi, Toyota (JP); Takumi Tanaka, Suntou-gun (JP); Shinichiro Kitsunai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 14/651,479

(22) PCT Filed: Nov. 1, 2013

(86) PCT No.: PCT/JP2013/079721
§ 371 (c)(1),
(2) Date: Jun. 11, 2015

(87) PCT Pub. No.: WO2014/103508
PCT Pub. Date: Jul. 3, 2014

(65) Prior Publication Data
US 2015/0318569 A1     Nov. 5, 2015

(30) Foreign Application Priority Data
Dec. 27, 2012   (JP) .................................. 2012-286176

(51) Int. Cl.
*H01M 10/0562*     (2010.01)
*H01M 10/0525*     (2010.01)
(Continued)

(52) U.S. Cl.
CPC ......... *H01M 10/0562* (2013.01); *C03C 3/323* (2013.01); *C03C 4/14* (2013.01);
(Continued)

(58) Field of Classification Search
CPC ......... H01M 10/0562; H01M 10/0525; H01M 2300/0068; C03C 3/323; C03C 4/14; H01B 1/10; Y02T 10/7011; Y02P 70/54
(Continued)

(56) References Cited

U.S. PATENT DOCUMENTS

2007/0160911 A1     7/2007    Senga et al.

FOREIGN PATENT DOCUMENTS

JP     2005-228570 A    8/2005
JP     2010-030889 A    2/2010
(Continued)

*Primary Examiner* — Gary Harris
(74) *Attorney, Agent, or Firm* — Oliff PLC

(57) ABSTRACT

A main object of the present invention is to provide a method for manufacturing a sulfide solid electrolyte that enables a sulfide solid electrolyte whose ion-conducting characteristic is easy to be improved, to be manufactured. The present invention is a method for manufacturing a sulfide solid electrolyte including loading a raw material for manufacturing a sulfide solid electrolyte which is mainly composed of a substance represented by the general formula of $(100-x)(0.75\text{Li}_2\text{S}\cdot 0.25\text{P}_2\text{S}_5)\cdot x\text{LiI}$ (here, $0<x<100$), into a vessel; and amorphizing the raw material after said loading, wherein a reaction site temperature in the vessel is controlled so that x included in the general formula and the reaction site temperature y [° C.] in the vessel in said amorphizing satisfy $y<-2.00x+1.79\times 10^2$.

20 Claims, 4 Drawing Sheets

(51) Int. Cl.
*H01B 1/10* (2006.01)
*C03C 3/32* (2006.01)
*C03C 4/14* (2006.01)

(52) U.S. Cl.
CPC .......... *H01B 1/10* (2013.01); *H01M 10/0525* (2013.01); *H01M 2300/0068* (2013.01); *Y02T 10/7011* (2013.01)

(58) Field of Classification Search
USPC ....................................................... 429/322
See application file for complete search history.

(56) References Cited

FOREIGN PATENT DOCUMENTS

| | | | |
|---|---|---|---|
| JP | 2010-140893 A | | 6/2010 |
| JP | 2012-104279 A | | 5/2012 |
| JP | 2012104279 A | * | 5/2012 |
| WO | 2012/026238 A1 | | 3/2012 |

\* cited by examiner

METHOD FOR MANUFACTURING SULFIDE SOLID ELECTROLYTE

TECHNICAL FIELD

The present invention relates to a method for manufacturing a sulfide solid electrolyte, and especially relates to a method for manufacturing a sulfide solid electrolyte using a raw material that includes LiI.

BACKGROUND ART

Lithium-ion secondary batteries have energy density higher than conventional secondary batteries, and can function with high voltage. Thus, lithium-ion batteries are used for information devices such as cellular phones as secondary batteries easy to be made to be small and light. Also, increasing these days is the demand for lithium-ion batteries as power for large-sized machines such as electric vehicles and hybrid vehicles.

A lithium-ion secondary battery has a positive electrode layer, a negative electrode layer and an electrolyte layer arranged between them. As an electrolyte used for an electrolyte layer, for example, liquid or solid non-aqueous substances and the like are known. When a liquid electrolyte (hereinafter referred to as "electrolyte solution") is used, the electrolyte solution is easy to permeate the positive electrode layer and the negative electrode layer. Thus, interfaces between the electrolyte solution and active materials contained in the positive electrode layer and negative electrode layer are easy to form, and the performance of the lithium-ion secondary battery is easy to be improved. However, since widely used electrolyte solutions are combustible, it is necessary to equip a lithium-ion secondary battery with a system to secure safety. On the other hand, when a solid electrolyte that is incombustible (hereinafter referred to as "solid electrolyte") is used, the above described system can be simplified. Therefore, progress is being made in the development of a lithium-ion secondary battery that has a layer containing a solid electrolyte (hereinafter referred to as "solid electrolyte layer") (such a lithium-ion secondary battery may be referred to as "all-solid-state battery" hereinafter).

As an art concerning solid electrolytes that can be used in all-solid-state batteries as described above, for example, Patent Literature 1 discloses the art of manufacturing $Li_2S$—$P_2S_5$ based crystallized glass (lithium ion conductive sulfide based crystallized glass) by means of a mechanical milling method.

CITATION LIST

Patent Literature

Patent Literature 1: JP 2005-228570 A

SUMMARY OF INVENTION

Technical Problem $Li_2S$—$P_2S_5$—LiI electrolytes can have good ion-conducting characteristics. Such an $Li_2S$—$P_2S_5$—LiI electrolyte is composed of an LiI-added $Li_2S$—$P_2S_5$ based electrolyte, which is a sulfide solid electrolyte having ion conductivity, and such an $Li_2S$—$P_2S_5$—LiI electrolyte also can be manufactured by means of the mechanical milling method as disclosed in Patent Literature 1. However, there is a problem that $Li_2S$—$P_2S_5$—LiI electrolytes of poor ion-conducting characteristics tend to be manufactured in a case of where $Li_2S$—$P_2S_5$—LiI electrolytes are manufactured according to the art disclosed in Patent Literature 1.

An object of the present invention is to provide a method for manufacturing a sulfide solid electrolyte, enabling a sulfide solid electrolyte of a good ion-conducting characteristic to be manufactured using a raw material that includes LiI.

Solution to Problem

As a result of intensive studies, the inventors of the present invention have found a view that: in a case where represented by y [° C.] is a reaction site temperature in a vessel where sulfide glass is synthesized when a sulfide solid electrolyte which is mainly composed of a substance represented by the general formula of (100−x) (0.75$Li_2$S.0.25$P_2S_5$).xLiI (here, 0<x<100) is manufactured using a raw material that includes LiI, a specific crystalline phase ($Li_3PS_4$—LiI crystalline phase and/or $Li_3PS_4$ crystalline phase. Hereinafter the same is applied) appears when y is, or over a predetermined temperature; and the ion-conducting characteristic of a sulfide solid electrolyte having the specific crystalline phase tends to be poor. Further, the inventors of the present invention have found a view that: the above specific crystalline phase can be prevented from appearing by control of the reaction site temperature y in the vessel when sulfide glass is synthesized so that the above x and y satisfy a predetermined conditional formula; and as a result, a sulfide solid electrolyte of a good ion-conducting characteristic can be manufactured. In addition, the inventors of the present invention have found a view that: the productivity of the sulfide solid electrolyte of a good ion-conducting characteristic is easy to be improved while the above specific crystalline phase is prevented from appearing, by the control of the reaction site temperature y in the vessel when sulfide glass is synthesized so that the above x and y satisfy a predetermined conditional formula. The present invention has been completed based on these findings.

To solve the above problem, the present invention takes the following means: that is, the present invention is a method for manufacturing a sulfide solid electrolyte, including loading a raw material for manufacturing a sulfide solid electrolyte which is mainly composed of a substance represented by a general formula of (100−x) (0.75$Li_2$S.0.25$P_2S_5$).xLiI (here, 0<x<100), into a vessel; and amorphizing the raw material after said loading, wherein a reaction site temperature in the vessel is controlled so that x included in the general formula and the reaction site temperature y [° C.] in the vessel in said amorphizing satisfy a following formula (1):

$$y < -2.00x + 1.79 \times 10^2 \qquad \text{Formula(1)}$$

Here, in the present invention, "a sulfide solid electrolyte which is mainly composed of a substance represented by a general formula of (100−x) (0.75$Li_2$S.0.25$P_2S_5$).xLiI" means that at least 50 mol % of this sulfide solid electrolyte is a sulfide solid electrolyte that is represented by the general formula of (100−x) (0.75$Li_2$S.0.25$P_2S_5$).xLiI. "(A) raw material for manufacturing a sulfide solid electrolyte which is mainly composed of a substance represented by a general formula of (100−x)(0.75$Li_2$S.0.25$P_2S_5$).xLiI" is not specifically limited as long as the $Li_2S$—$P_2S_5$—LiI electrolyte can be manufactured from this raw material (hereinafter, may simply referred to as "raw material for an electrolyte").

Exemplifications of such a raw material for an electrolyte include the combination of $Li_2S$, $P_2S_5$ and LiI, and the combination of other raw materials including Li, P, S and I. Also in the present invention, "loading" may be a step of loading at least the raw material for an electrolyte into the vessel, which may be a step of loading, for example, a liquid as used in a wet mechanical milling method, together with the raw material for an electrolyte, into the vessel. Also in the present invention, "amorphizing" may be a wet mechanical milling method using a liquid such as hydrocarbons that does not react with the raw material or the electrolyte to be generated; may be a dry mechanical milling method not using the liquid; and may be melt extraction. In addition, a method other than mechanical milling also can be used such as: the raw material loaded into the vessel is amorphized by heating and stirring the raw material to react. "(A) reaction site temperature in the vessel is controlled so that . . . satisfy a following formula (1)" in a case of amorphizing of amorphizing the raw material via a mechanical milling method means that the reaction site temperature in the vessel is controlled so that the highest temperature at the reaction site in amorphizing satisfies the formula (1). On the contrary, "a reaction site temperature in the vessel is controlled so that . . . satisfy a following formula (1)" in a case of amorphizing of amorphizing the raw material via melt extraction means that the reaction site temperature in the vessel is controlled so that the formula (1) is satisfied by the final temperature (lowest temperature) that is at sudden cooling after once the reaction site temperature rises so as to satisfy $y \geq -2.00x+1.79\times 10^2$ in amorphizing.

Including amorphizing of amorphizing the raw material while controlling the reaction site temperature y in the vessel when this raw material is amorphized so as to satisfy the above formula (1) makes it possible to manufacture the $Li_2S$—$P_2S_5$—LiI electrolyte without appearance of the specific crystalline phase that causes low ion conductivity. No appearance of crystals that cause low ion conductivity makes it easy to achieve a good ion-conducting characteristic of the manufactured $Li_2S$—$P_2S_5$—LiI electrolyte.

In the above present invention, said x may be equal to or larger than 20 ($20 \leq x < 100$).

In the above present invention, it is preferable that in said amorphizing, the reaction site temperature in the vessel is 40° C. or over. Such a manner makes it easy to increase the speed in amorphizing the raw material to synthesize sulfide glass. Thus, manufacturing costs for the sulfide solid electrolyte is easy to be reduced.

In the above present invention, it is preferable that the reaction site temperature in the vessel is further controlled so that said x and the reaction site temperature y satisfy a following formula (2). Such a manner makes it easy to speed up the synthesis of sulfide glass while preventing the above specific crystalline phase from appearing. Thus, the productivity of the sulfide solid electrolyte of a good ion-conducting characteristic is easy to be improved.

$$y > -2.00x+1.52\times 10^2 \quad \text{Formula (2)}$$

In the above present invention, it is preferable that in said amorphizing, heat energy is given to an inside of the vessel. Such a manner makes it easy to control the speed in synthesizing sulfide glass by means of control of the given heat energy. As a result, it gets easy to manufacture the sulfide solid electrolyte of an excellent ion-conducting characteristic while speeding up the synthesis of sulfide glass.

Here, exemplifications of "heat energy is given to an inside of the vessel" include a manner of giving heat energy to the inside of the vessel by heating the vessel from the outside; a manner of generating heat energy in the vessel without an outside heat source while preventing heat radiation, to enable the reaction site temperature in the vessel to be a predetermined temperature or over (for example, a manner of using a vessel larger than that used in the case of heating outside, in the mechanical milling method).

In the above present invention, said amorphizing may be amorphizing the raw material by a wet mechanical milling method. Such a manner also makes it possible to manufacture the sulfide solid electrolyte of a good ion-conducting characteristic using the raw material that includes LiI.

Advantageous Effects of Invention

According to the present invention, provided can be a method for manufacturing a sulfide solid electrolyte that enables a sulfide solid electrolyte of a good ion-conducting characteristic using a raw material that includes LiI to be manufactured.

DESCRIPTION OF EMBODIMENTS

The present invention will be explained with reference to the drawings hereinafter. The following embodiments are exemplifications of the present invention, and the present invention is not limited thereto.

Figure 1:
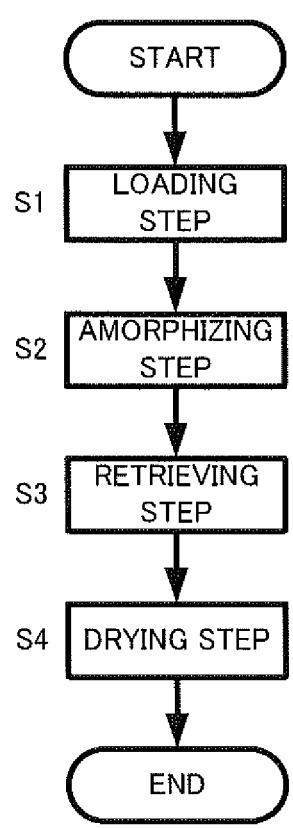
FIG. 1 is a view to explain the method for manufacturing a sulfide solid electrolyte of the present invention.

FIG. 1 is a view to explain the method for manufacturing a sulfide solid electrolyte of the present invention (hereinafter may referred to as "manufacturing method of the present invention"). The manufacturing method of the present invention depicted in FIG. 1 includes a loading step (S1), an amorphizing step (S2), a retrieving step (S3) and a drying step (S4).

The loading step (hereinafter may be referred to as "S1") is a step of loading a raw material for manufacturing an $Li_2S$—$P_2S_5$—LiI electrolyte into a vessel. For example, if the amorphizing step described later is a step of synthesizing the $Li_2S$—$P_2S_5$—LiI electrolyte via a wet mechanical milling method, S1 can be a step of loading a raw material for an electrolyte and a liquid such as hydrocarbons that does not react with the raw material for an electrolyte or the $Li_2S$—$P_2S_5$—LiI electrolyte to be synthesized, into the vessel.

Here, exemplifications of the raw material for an electrolyte that can be used in S1 include the combination of $Li_2S$, $P_2S_5$ and LiI, and the combination of other raw materials including Li, P, S and I. Exemplifications of the liquid that can be used in S1 include alkanes such as heptane, hexane and octane, and aromatic hydrocarbons such as benzene, toluene and xylen.

The amorphizing step (hereinafter may be referred to as "S2") is a step of amorphizing the raw material, which is loaded into the vessel in S1, to synthesize sulfide glass. If the liquid is loaded into the vessel together with the raw material for an electrolyte in S1, S2 can be a step of amorphizing the raw material via the wet mechanical milling method, to synthesize sulfide glass. In contrast, if the liquid is not loaded into the vessel together with the raw material for an electrolyte in S1, S2 can be a step of amorphizing the raw material via a dry mechanical milling method, to synthesize sulfide glass. In addition, S2 can be a step of amorphizing the raw material by melt extraction, to synthesize sulfide glass. However, in view of easily reducing the manufacturing costs because the process can be carried out at a room temperature, and so on, it is preferable that S2 is a step of synthesizing sulfide glass via the (wet or dry) mechanical milling method. Further, in view of preventing raw material composites from adhering to a wall of the vessel, to easily obtain more amorphous sulfide glass and so on, it is preferable that S2 is a step of synthesizing sulfide glass via the wet mechanical milling method. The mechanical milling method has an advantage of being possible to synthesize sulfide glass of a target composition easily while the melt extraction has limit in reaction environment and reaction vessel therefor.

In order not to form the specific crystalline phase, which is perceived in the $Li_2S$—$P_2S_5$—$LiI$ electrolyte of a poor ion-conducting characteristic, sulfide glass is synthesized in S2 while controlling the reaction site temperature y in the vessel so that the following formula (1) is satisfied by the LiI content x [mol %] when the $Li_2S$—$P_2S_5$—$LiI$ electrolyte is represented by the general formula (100−x)(0.75$Li_2S$.0.25$P_2S_5$).xLiI (that is, the LiI content x [mol %] included in the raw material for an electrolyte) and the reaction site temperature y [° C.] in the vessel when sulfide glass is synthesized in the amorphizing step:

$$y < -2.00x + 1.79 \times 10^2 \quad \text{Formula (1)}$$

As the above, the specific crystalline phase, which is perceived in the $Li_2S$—$P_2S_5$—$LiI$ electrolyte of a poor ion-conducting characteristic, can be prevented from forming by the synthesis of sulfide glass while the reaction site temperature in the vessel is controlled so that x and y satisfy the above formula (1). As a result, the sulfide solid electrolyte of a good ion-conducting characteristic ($Li_2S$—$P_2S_5$—$LiI$ electrolyte. Hereinafter the same is applied) can be manufactured.

The inventors of the present invention have found that in a case where carried out is the mechanical milling method where the reaction site temperature rises according to friction due to the movement of a raw material accommodated in the predetermined vessel without heating from the outside of the predetermined vessel, the reaction site temperature in the predetermined vessel is about 20° C. higher than the temperature over the outer surface of the predetermined vessel. The inventors of the present invention have also found that in a case where carried out is the mechanical milling method of heating from the outside of the predetermined vessel, the reaction site temperature in the predetermined vessel is about 20° C. lower than the temperature over the outer surface of the predetermined vessel. Therefore, according to either type of the mechanical milling methods, it is possible to indirectly control the reaction site temperature in the vessel via control of temperature over the outer surface of the vessel. As described above, a temperature difference between the inside and outside of the vessel can be about 20° C. in both cases of heating and not heating from the outside of the vessel. Thus, in a case where the above predetermined vessel is used, it can be considered that a temperature difference between the inside and outside of the vessel is about 20° C. even if the vessel is cooled from the outside, and thus, the reaction site temperature in the vessel in the case where the vessel is cooled from the outside is about 20° C. higher than the temperature over the outer surface of the vessel. Therefore, it is possible to indirectly control the reaction site temperature in the vessel via control of the temperature over the outer surface of the vessel even if sulfide glass is synthesized via the process of sudden cooling.

The retrieving step (hereinafter may referred to as "S3") is a step of taking the sulfide glass synthesized in S2 out of the vessel and retrieving the taken-out sulfide glass.

The drying step (hereinafter may referred to as "S4") is a step of drying the sulfide glass retrieved in S3, to volatilize the liquid, which is loaded into the vessel together with the raw material for an electrolyte. For example, if S2 is a step of synthesizing sulfide glass by means of the dry mechanical milling method, S4 is not necessary.

The sulfide solid electrolyte can be manufactured via the above S1 to S4. Via the manufacturing method of the present invention, sulfide glass is synthesized while the reaction site temperature in the vessel when the sulfide glass is synthesized is controlled so as to satisfy the above formula (1). It is possible to prevent the specific crystalline phase, which is perceived in the $Li_2S$—$P_2S_5$—$LiI$ electrolyte of a poor ion-conducting characteristic, from forming, by synthesizing sulfide glass as controlling the temperature as the above. Thus, according to the manufacturing method of the present invention, the sulfide solid electrolyte of a good ion-conducting characteristic can be manufactured.

The above explanation mentions the manner of controlling the reaction site temperature in the vessel when sulfide glass is synthesized in the amorphizing step so that x and y satisfy the above formula (1). As mentioned above, the sulfide solid electrolyte of a good ion-conducting characteristic can be manufactured by controlling the reaction site temperature in the vessel when sulfide glass is synthesized in the amorphizing step so that x and y satisfy the above formula (1). Here, in order to improve the productivity of the sulfide solid electrolyte of a good ion-conducting characteristic, it is preferable that the reaction site temperature in the amorphizing step is raised as high as possible as long as the above formula (1) is satisfied. In such a view, it is preferable in the manufacturing method of the present invention to make the reaction site temperature in the vessel 40° C. or over in the amorphizing step. In the same view, it is preferable that the reaction site temperature in the vessel when sulfide glass is synthesized in the amorphizing step is controlled so that x and y satisfy not only the above formula (1) but also the formula (2) below:

$$y > -2.00x + 1.52 \times 10^2 \quad \text{Formula (2)}$$

Further, as described below, the sulfide solid electrolyte of a good ion-conducting characteristic is easily manufactured by controlling the reaction site temperature in the vessel when sulfide glass is synthesized in the amorphizing step so that x and y satisfy not only the above formulas (1) and (2) but also the formula (3) below. Thus, in the present invention, it is especially preferable to control the reaction site temperature y in the vessel when sulfide glass is synthesized in the amorphizing step so as to satisfy the above formulas (1) and (2) and the formula (3) below:

$$y \leq -1.70x + 1.655 \times 10^2 \quad \text{Formula (3)}$$

According to the manufacturing method of the present invention, it is possible that time for synthesizing sulfide glass is shortened by controlling the reaction site temperature y so as to be as high as possible as long as the above formula (1) is satisfied. Thus, the manufacturing costs for the sulfide solid electrolyte can be reduced.

EXAMPLES

Examples will be presented, to further specifically explain the present invention.

1. Manufacture of Sulfide Solid Electrolyte

Example 1

As raw materials for an electrolyte, used were lithium sulfide ($Li_2S$, manufactured by Nippon Chemical Industries CO., LTD, 99.9% purity. Hereinafter the same is applied), phosphorus pentasulfide ($P_2S_5$, manufactured by Aldrich, 99.9% purity. Hereinafter the same is applied) and lithium iodide (LiI, manufactured by Aldrich. Hereinafter the same is applied). These raw materials for an electrolyte were weighed so as to have the molar ratio of $Li_2S$:$P_2S_5$:LiI=63.75:21.25:15. The weighed raw materials for an electrolyte were loaded into a vessel (45 ml, made from $ZrO_2$) of a planetary ball mill along with tridecane. In addition, balls, made from $ZrO_2$, of 5 mm in diameter were loaded into the vessel, and the vessel was completely sealed hermetically. Heat Label (manufactured by MICRON Corp.) was stuck on the outer surface of the vessel in order to measure the temperature during mechanical milling.

This vessel was fixed to the planetary ball mill (manufactured by Ito Seisakusho Co., Ltd.) that had a function of heating the vessel from the outside, and the sulfide glass ($85(0.75Li_2S.0.25P_2S_5).15LiI$) of Example 1 was synthesized by mechanical milling, carried out at a setting temperature 160° C. at 488 rpm for four hours. At this time, temperature over the outer surface of the vessel (final temperature of Heat Label) during the mechanical milling was 160° C. It was known that according to preparatory experiments, in a case where this vessel was heated from the outside during the mechanical milling, the reaction site temperature in the vessel was 20° C. lower than the temperature of the outer surface of the vessel. Thus, the reaction site temperature in Example 1 was 140° C.

After the mechanical milling was completed, $85(0.75Li_2S.0.25P_2S_5).15LiI$ was retrieved from the vessel, and tridecane was removed by vacuum drying at 80° C. Whereby, the sulfide solid electrolyte ($85(0.75Li_2S.0.25P_2S_5).15LiI$) according to Example 1 was obtained.

Example 2

Sulfide glass ($85(0.75Li_2S.0.25P_2S_5).15LiI$) was synthesized under the same conditions as Example 1 except that the setting temperature when the vessel was heated from the outside was 150° C. The temperature of Heat Label when the sulfide glass was synthesized was 149° C. Thus, the reaction site temperature in Example 2 was 129° C.

Example 3

Sulfide glass ($85(0.75Li_2S.0.25P_2S_5).15LiI$) was synthesized under the same conditions as Example 1 except that the setting temperature when the vessel was heated from the outside was 145° C. The temperature of Heat Label when the sulfide glass was synthesized was 143° C. Thus, the reaction site temperature in Example 3 was 123° C.

Example 4

Sulfide glass ($80(0.75Li_2S.0.25P_2S_5).20LiI$) was synthesized under the same conditions as Example 3 except that lithium sulfide, phosphorus pentasulfide and lithium iodide that were weighed so as to have the molar ratio of $Li_2S$:$P_2S_5$:LiI=60:20:20 were used as raw materials for an electrolyte. The reaction site temperature in Example 4 was 123° C.

Example 5

Sulfide glass ($80(0.75Li_2S.0.25P_2S_5).20LiI$) was synthesized under the same conditions as Example 4 except that the setting temperature when the vessel was heated from the outside was 135° C. The temperature of Heat Label when the sulfide glass was synthesized was 132° C. Thus, the reaction site temperature in Example 5 was 112° C.

Example 6

Sulfide glass ($80(0.75Li_2S.0.25P_2S_5).20LiI$) was synthesized under the same conditions as Example 4 except that the setting temperature when the vessel was heated from the outside was 125° C. The temperature of Heat Label when the sulfide glass was synthesized was 122° C. Thus, the reaction site temperature in Example 6 was 102° C.

Example 7

Sulfide glass ($75(0.75Li_2S.0.25P_2S_5).25LiI$) was synthesized under the same conditions as Example 3 except that lithium sulfide, phosphorus pentasulfide and lithium iodide that were weighed so as to have the molar ratio of $Li_2S$:$P_2S_5$:LiI=56.25:18.75:25 were used as raw materials for an electrolyte. The reaction site temperature in Example 7 was 123° C.

Example 8

As raw materials for an electrolyte, lithium sulfide, phosphorus pentasulfide and lithium iodide were used. These raw materials for an electrolyte were weighed so as to have the molar ratio of $Li_2S$:$P_2S_5$:LiI=52.5:17.5:30. The weighed raw materials for an electrolyte were loaded into a vessel (500 ml, made from $ZrO_2$) of a planetary ball mill (P5 manufactured by FRITSCH GmbH) along with heptane. In addition, balls, made from $ZrO_2$, of 5 mm in diameter were loaded into the vessel, and the vessel was completely sealed hermetically. Heat Label (manufactured by MICRON Corp.) was stuck on the outer surface of the vessel in order to measure the temperature during mechanical milling.

This vessel was fixed to the planetary ball mill, and sulfide glass ($70(0.75Li_2S.0.25P_2S_5).30LiI$) of Example 8 was synthesized by mechanical milling, carried out at 280 rpm for sixty hours. At this time, temperature over the outer surface of the vessel (final temperature of Heat Label) during the mechanical milling was 88° C. It was known that according to preparatory experiments, in a case where the vessel of 500 ml in volume was not heated from the outside during the mechanical milling using this vessel, the reaction site temperature in the vessel was 20° C. higher than the temperature of the outer surface of the vessel. Thus, the reaction site temperature in Example 8 was 108° C.

After the mechanical milling was completed, $70(0.75Li_2S.0.25P_2S_5).30LiI$ was retrieved from the vessel, and heptane was removed by drying at 100° C. Whereby, the sulfide solid electrolyte ($70(0.75Li_2S.0.25P_2S_5).30LiI$) according to Example 8 was obtained.

Comparative Example 1

Sulfide glass ($85(0.75Li_2S.0.25P_2S_5).15LiI$) was synthesized under the same conditions as Example 1 except that the setting temperature when the vessel was heated from the outside was 170° C. The temperature of Heat Label when the sulfide glass was synthesized was 169° C. Thus, the reaction site temperature in Comparative Example 1 was 149° C.

Comparative Example 2

Sulfide glass (80(0.75Li$_2$S.0.25P$_2$S$_5$).20LiI) was synthesized under the same conditions as Example 4 except that the setting temperature when the vessel was heated from the outside was 160° C. The temperature of Heat Label when the sulfide glass was synthesized was 160° C. Thus, the reaction site temperature in Comparative Example 2 was 140° C.

Comparative Example 3

Sulfide glass (75(0.75Li$_2$S.0.25P$_2$S$_5$).25LiI) was synthesized under the same conditions as Example 7 except that the setting temperature when the vessel was heated from the outside was 155° C. The temperature of Heat Label when the sulfide glass was synthesized was 155° C. Thus, the reaction site temperature in Comparative Example 3 was 135° C.

Comparative Example 4

Sulfide glass (70(0.75Li$_2$S.0.25P$_2$S$_5$).30LiI) was synthesized under the same conditions as Example 8 except that the mechanical milling was carried out at 300 rpm. The temperature of Heat Label when the sulfide glass was synthesized was 139° C. Thus, the reaction site temperature in Comparative Example 4 was 119° C.

2. Analysis
[X-Ray Diffraction]

Figure 2:
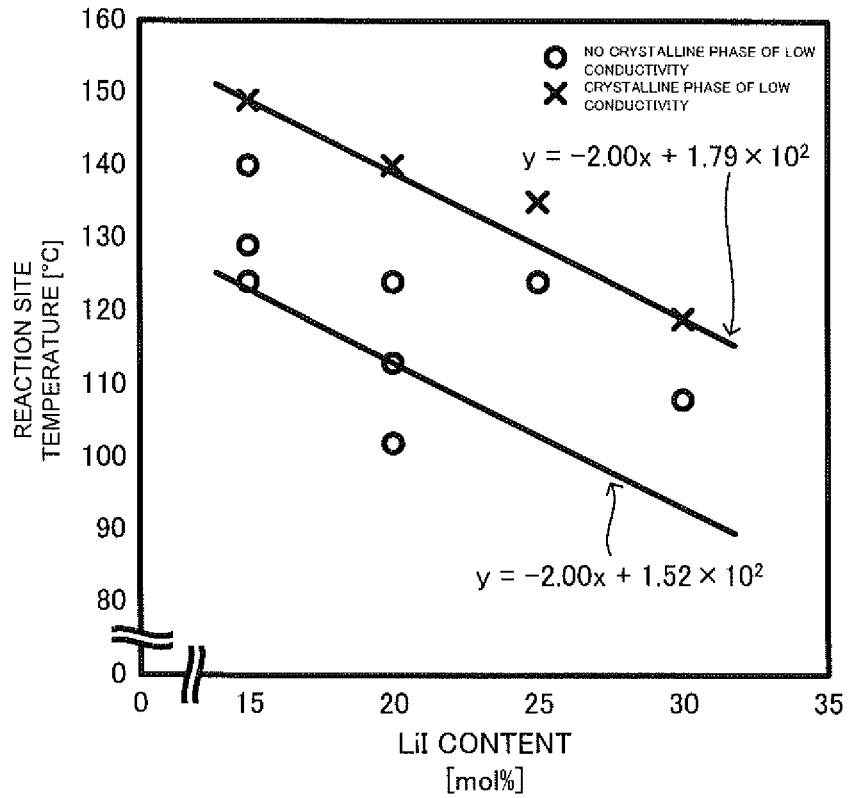
FIG. 2 is a view to explain experimental results.

It was examined by X-ray diffraction whether or not there was any of Li$_3$PS$_4$—LiI crystalline phase and Li$_3$PS$_4$ crystalline phase, which were perceived in the Li$_2$S—P$_2$S$_5$—LiI electrolyte of a poor ion-conducting characteristic, in each sulfide solid electrolyte manufactured in Examples 1 to 8 and Comparative Examples 1 to 4. The results of the examination are depicted in FIG. 2. The vertical axis in FIG. 2 represents the reaction site temperature [° C.] and the horizontal axis therein represents the LiI content in the raw materials for an electrolyte [mol %]. In FIG. 2, "○" means that none of Li$_3$PS$_4$—LiI crystalline phases and Li$_3$PS$_4$ crystalline phases were perceived, and "×" means that any of Li$_3$PS$_4$—LiI crystalline phases and Li$_3$PS$_4$ crystalline phases were perceived. The lines depicted in FIG. 2 represent y=−2.00x+1.79×10$^2$; and y=−2.00x+1.52×10$^2$ (where x is the Li content in the raw materials for an electrolyte [mol %] and y is the reaction site temperature [° C.]). y=−2.00x+1.52×10$^2$ is the line passing through the result of Example 5 with slope −2.00.

Figure 3:
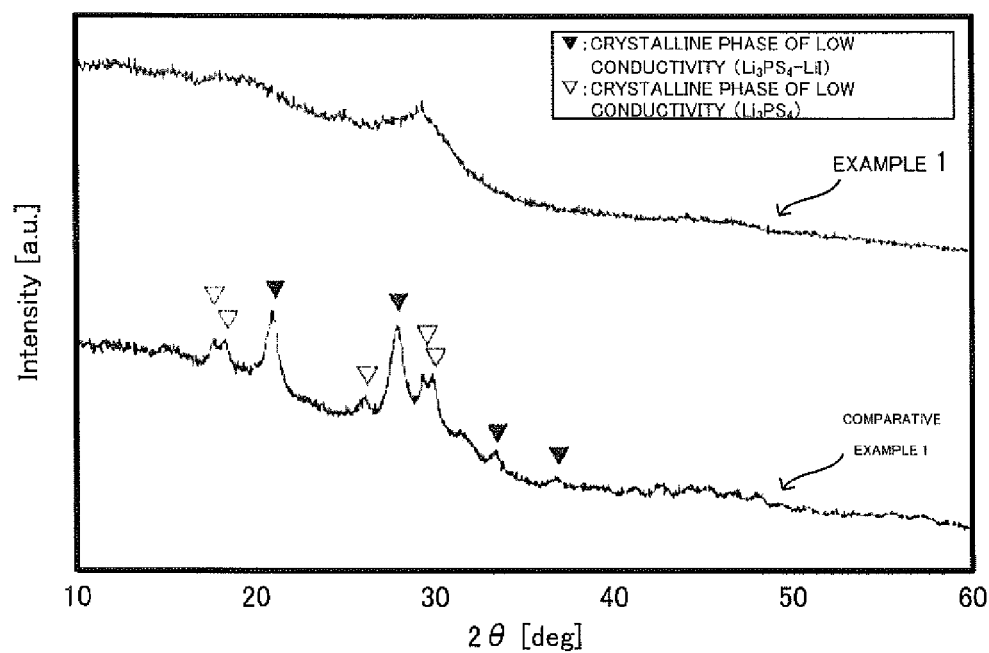
FIG. 3 depicts results of measurement by X-ray diffraction.
Figure 4:
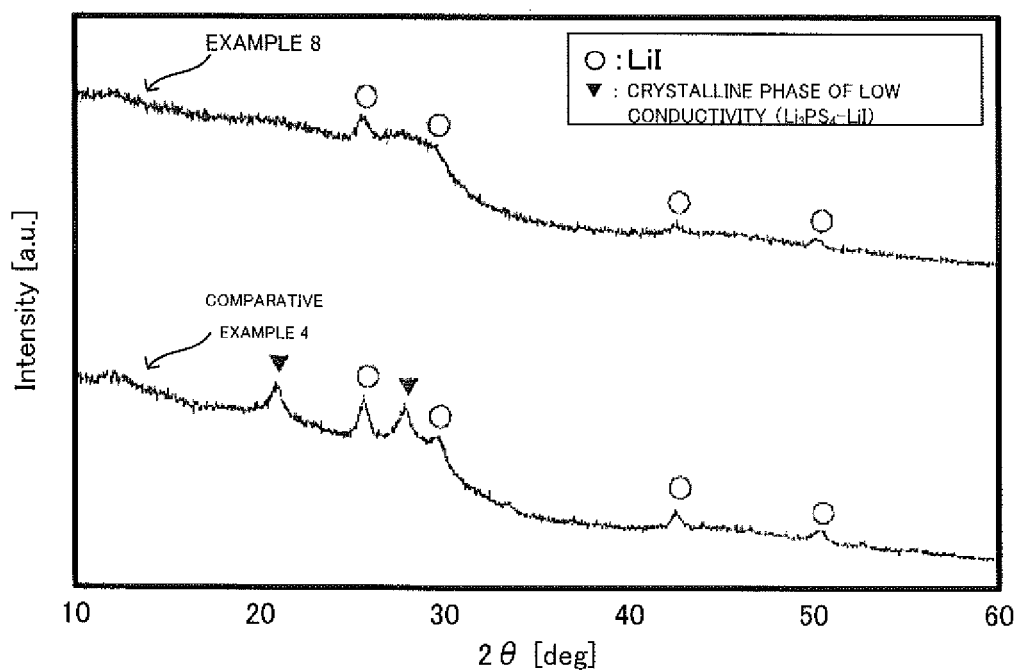
FIG. 4 depicts results of measurement by X-ray diffraction.

FIG. 3 depicts X-ray diffraction patterns of the sulfide solid electrolytes manufactured under the conditions of Example 1 and Comparative Example 1. FIG. 4 depicts X-ray diffraction patterns of the sulfide solid electrolytes synthesized under the conditions of Example 8 and Comparative Example 4. In FIG. 3, "▼" indicates the peak derived from the Li$_3$PS$_4$—LiI crystalline phase, and "∇" indicates the peak derived from the Li$_3$PS$_4$ crystalline phase. In FIG. 4, "○" indicates the peak derived from LiI, and "▼" indicates the peak derived from the Li$_3$PS$_4$—LiI crystalline phase.

[Determination of Ion Conductivity]

Each sulfide solid electrolyte manufactured under the conditions of Example 8 and Comparative Example 4 was pelletized, and the Li ion conductivity (room temperature) was calculated from the resistance measured by AC impedance measurement. Solartron's 1260 was used for the measurement. Measurement conditions were: applied voltage 5 mV; and measurement frequency range 0.01 MHz to 1 MHz. The resistance at 100 kHz was read, and the thickness compensated, to be converted to the Li ion conductivity.

3. Results

The line that connects the result of Comparative Example 1 to the result of Comparative Example 4 is y=−2.00x+1.79×10$^2$, which is depicted in FIG. 2. As exemplified by the X-ray diffraction pattern of Comparative Example 1 depicted in FIG. 3 and the X-ray diffraction pattern of Comparative Example 4 depicted in FIG. 4, Li$_3$PS$_4$—LiI crystalline phases, or both Li$_3$PS$_4$—LiI crystalline phases and Li$_3$PS$_4$ crystalline phases were perceived in the sulfide solid electrolytes manufactured under the conditions of Comparative Examples 1 to 4. In Comparative Examples 1 to 4, the relationship of y≥−2.00x+1.79×10$^2$ was established between x in (100−x)(0.75Li$_2$S.0.25P$_2$S$_5$).xLiI and y of the reaction site temperature y. On the contrary, as exemplified by the X-ray diffraction pattern of Example 1 depicted in FIG. 3 and the X-ray diffraction pattern of Example 8 depicted in FIG. 4, the sulfide solid electrolytes manufactured under the conditions of Examples 1 to 8 were amorphous. None of Li$_3$PS$_4$—LiI crystalline phases and Li$_3$PS$_4$ crystalline phases were perceived in these electrolytes. Examples 1 to 8 satisfied y<−2.00x+1.79×10$^2$. Since the line passing through the results of Examples 1 and 7 was y=−1.70x+1.655×10$^2$, Examples 1 to 8 satisfied y≤−1.70x+1.655×10$^2$. Examples 1 to 4, 7 and 8 also satisfied y>−2.00x+1.52×10$^2$.

While the Li ion conductivity of the sulfide solid electrolyte manufactured under the conditions of Example 8 was 1.76×10$^{-3}$ S/cm, the Li ion conductivity of the sulfide solid electrolyte manufactured under the conditions of Comparative Example 4 was 1.50×10$^{-3}$ S/cm. That is, the Li ion conductivity of a sulfide solid electrolyte where none of Li$_3$PS$_4$—LiI crystalline phases and Li$_3$PS$_4$ crystalline phases were perceived was higher than that of a sulfide solid electrolyte where any of Li$_3$PS$_4$—LiI crystalline phases and Li$_3$PS$_4$ crystalline phases were perceived.

From the above, it was confirmed that the Li$_2$S—P$_2$S$_5$—LiI electrolyte of a good ion-conducting characteristic was able to be manufactured by manufacturing the sulfide solid electrolyte via the process of synthesizing sulfide glass while the reaction site temperature was controlled so as to satisfy y<−2.00x+1.79×10$^2$. It was also found that the Li$_2$S—P$_2$S$_5$—LiI electrolyte of a good ion-conducting characteristic was easy to be manufactured by manufacturing the sulfide solid electrolyte via the process of synthesizing sulfide glass while the reaction site temperature was controlled so as to satisfy y≤−1.70x+1.655×10$^2$.

As described above, in Examples 1 to 8, the Li$_2$S—P$_2$S$_5$—LiI electrolyte of a good ion-conducting characteristic was able to be manufactured by controlling the reaction site temperature when sulfide glass was synthesized via the wet mechanical milling method. Here, the mechanical milling method is a technique of synthesizing a target substance by making solid raw materials react to each other. Thus, it is considered that the technical concept of the present invention is applicable to a case where an Li$_2$S—P$_2$S$_5$—LiI electrolyte is synthesized by making solid raw materials react to each other. Therefore, h is considered that the Li$_2$S—P$_2$S$_5$—LiI electrolyte of a good ion-conducting characteristic can be manufactured by controlling the reaction site temperature in synthesis even if a method other than the mechanical milling method is used when the Li$_2$S—P$_2$S$_5$—

LiI electrolyte is manufactured and if the method used here is that of synthesizing the Li$_2$S—P$_2$S$_5$—LiI electrolyte by making solid raw materials react to each other.

The invention claimed is:

1. A method for manufacturing a sulfide solid electrolyte, the method comprising:
    loading a raw material for manufacturing a sulfide solid electrolyte which is mainly composed of a substance represented by a general formula of (100-x)(0.75Li$_2$S.0.25P$_2$S$_5$).xLiI (here, 0<x<100), into a vessel; and
    amorphizing the raw material after said loading by giving heat energy to an inside of the vessel,
    wherein a reaction site temperature in the vessel is controlled so that x included in the general formula and the reaction site temperature y (° C.) in the vessel in said amorphizing satisfy a following Formula (1):

$$y < -2.00x + 1.79 \times 10^2 \qquad \text{Formula (1).}$$

2. The method for manufacturing a sulfide solid electrolyte according to claim 1, wherein said x is equal to or larger than 20.

3. The method for manufacturing a sulfide solid electrolyte according to claim 1, wherein in said amorphizing, the reaction site temperature in the vessel is 40° C. or over.

4. The method for manufacturing a sulfide solid electrolyte according to claim 1, wherein the reaction site temperature in the vessel is further controlled so that said x and the reaction site temperature y satisfy a following Formula (2):

$$y > -2.00x + 1.52 \times 10^2 \qquad \text{Formula (2).}$$

5. The method for manufacturing a sulfide solid electrolyte according to claim 1, wherein said amorphizing is amorphizing the raw material by a wet mechanical milling method.

6. The method for manufacturing a sulfide solid electrolyte according to claim 1, wherein said x satisfies 15≤x≤30.

7. The method for manufacturing a sulfide solid electrolyte according to claim 2, wherein in said amorphizing, the reaction site temperature in the vessel is 40° C. or over.

8. The method for manufacturing a sulfide solid electrolyte according to claim 2, wherein the reaction site temperature in the vessel is further controlled so that said x and the reaction site temperature y satisfy a following formula (2):

$$y > -2.00x + 1.52 \times 10^2 \qquad \text{Formula (2).}$$

9. The method for manufacturing a sulfide solid electrolyte according to claim 2, wherein said amorphizing is amorphizing the raw material by a wet mechanical milling method.

10. The method for manufacturing a sulfide solid electrolyte according to claim 3, wherein said amorphizing is amorphizing the raw material by a wet mechanical milling method.

11. The method for manufacturing a sulfide solid electrolyte according to claim 4, wherein said amorphizing is amorphizing the raw material by a wet mechanical milling method.

12. The method for manufacturing a sulfide solid electrolyte according to claim 7, wherein said amorphizing is amorphizing the raw material by a wet mechanical milling method.

13. The method for manufacturing a sulfide solid electrolyte according to claim 8, wherein said amorphizing is amorphizing the raw material by a wet mechanical milling method.

14. The method for manufacturing a sulfide solid electrolyte according to claim 2, wherein said x satisfies 15≤x≤30.

15. The method for manufacturing a sulfide solid electrolyte according to claim 3, wherein said x satisfies 15≤x≤30.

16. The method for manufacturing a sulfide solid electrolyte according to claim 4, wherein said x satisfies 15≤x≤30.

17. The method for manufacturing a sulfide solid electrolyte according to claim 5, wherein said x satisfies 15≤x≤30.

18. The method for manufacturing a sulfide solid electrolyte according to claim 7, wherein said x satisfies 15≤x≤30.

19. The method for manufacturing a sulfide solid electrolyte according to claim 8, wherein said x satisfies 15≤x≤30.

20. The method of claim 1, where the reaction site temperature in the vessel is indirectly controlled via a controlling of a temperature over an outer surface of the vessel.

* * * * *